Figure 1:
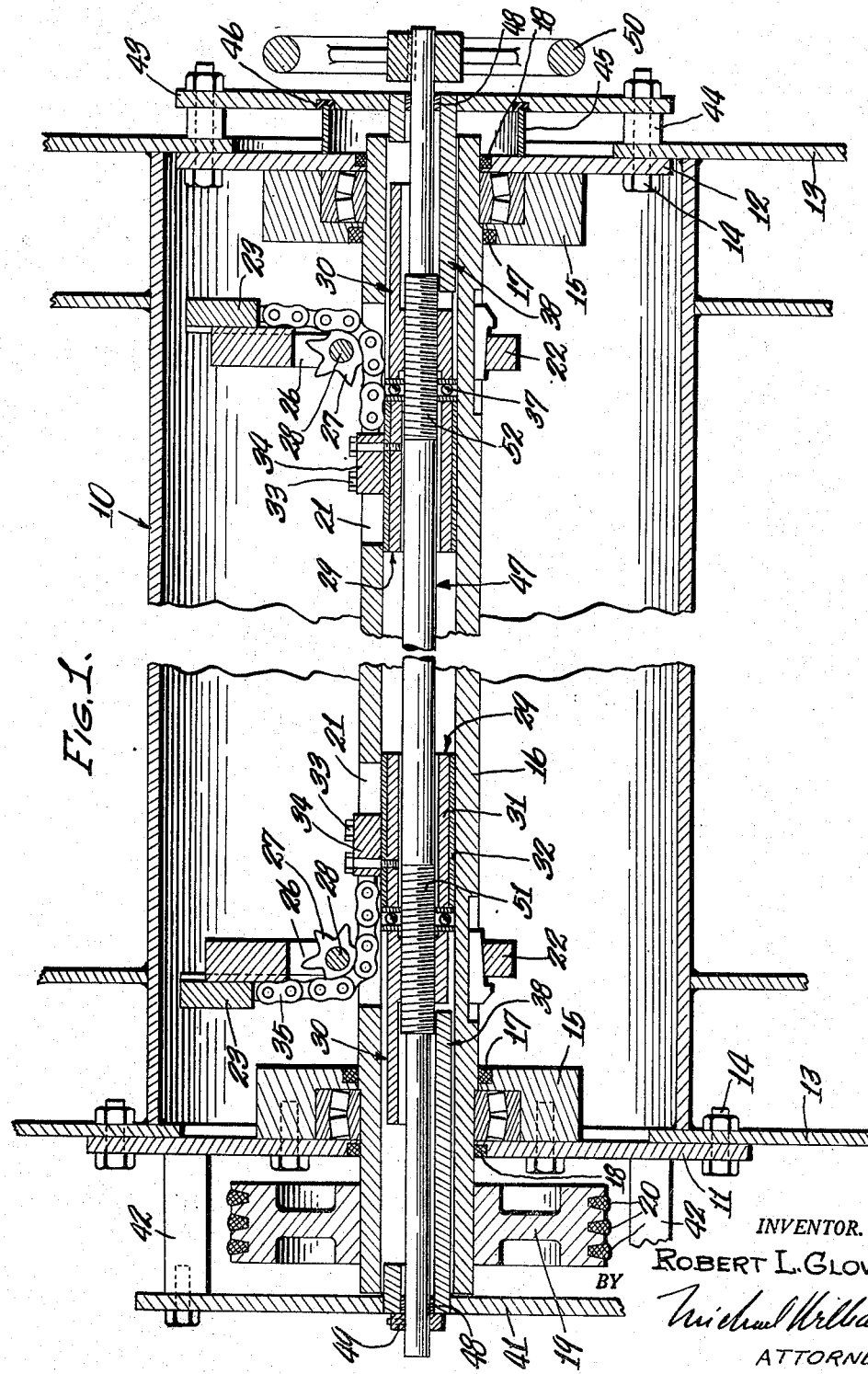

Nov. 24, 1953

R. L. GLOVER 2,660,067

VIBRATION DEVICE

Filed Aug. 2, 1949

3 Sheets-Sheet 1

INVENTOR.
ROBERT L. GLOVER
BY
ATTORNEY

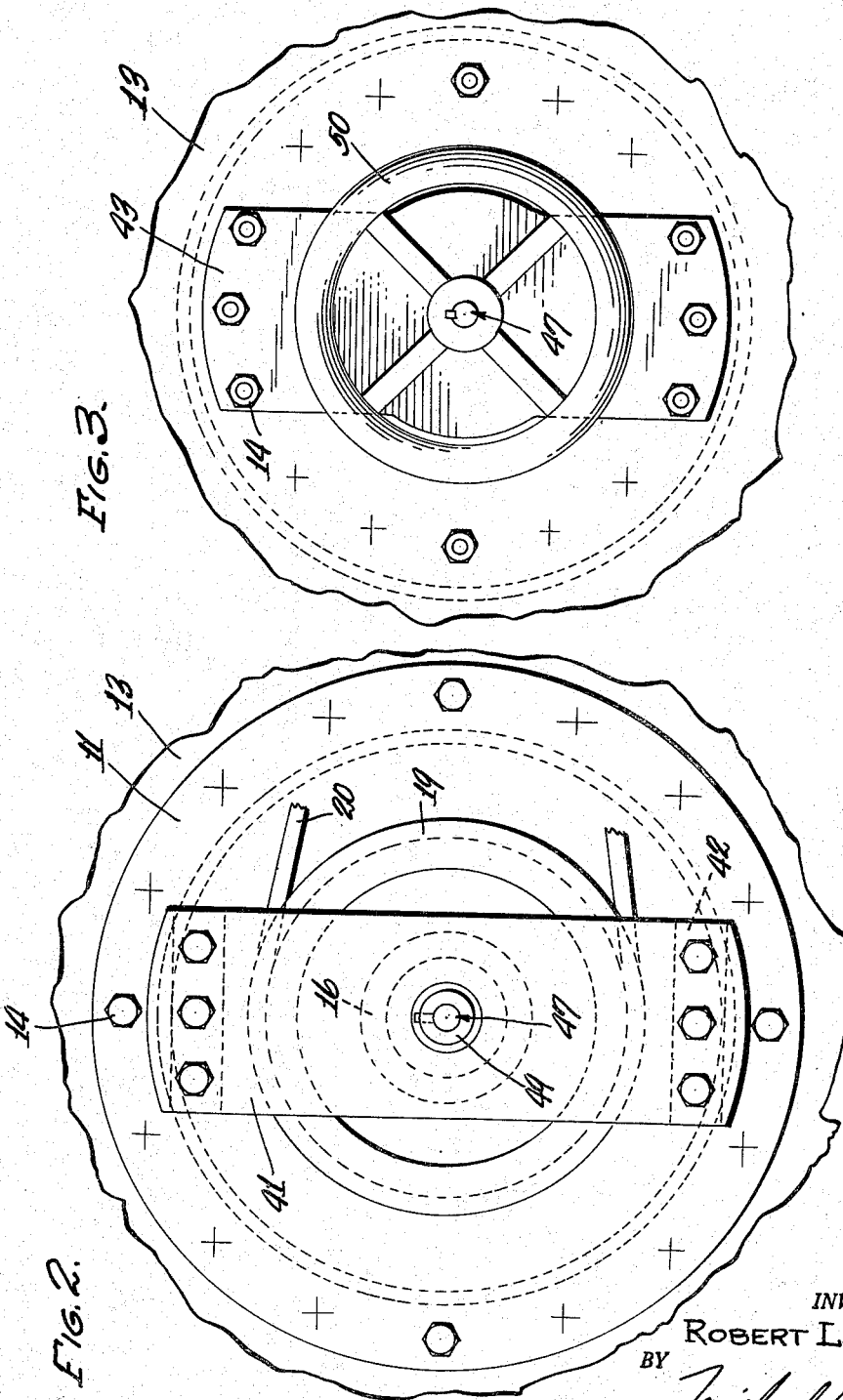

Nov. 24, 1953   R. L. GLOVER   2,660,067
VIBRATION DEVICE
Filed Aug. 2, 1949   3 Sheets-Sheet 3
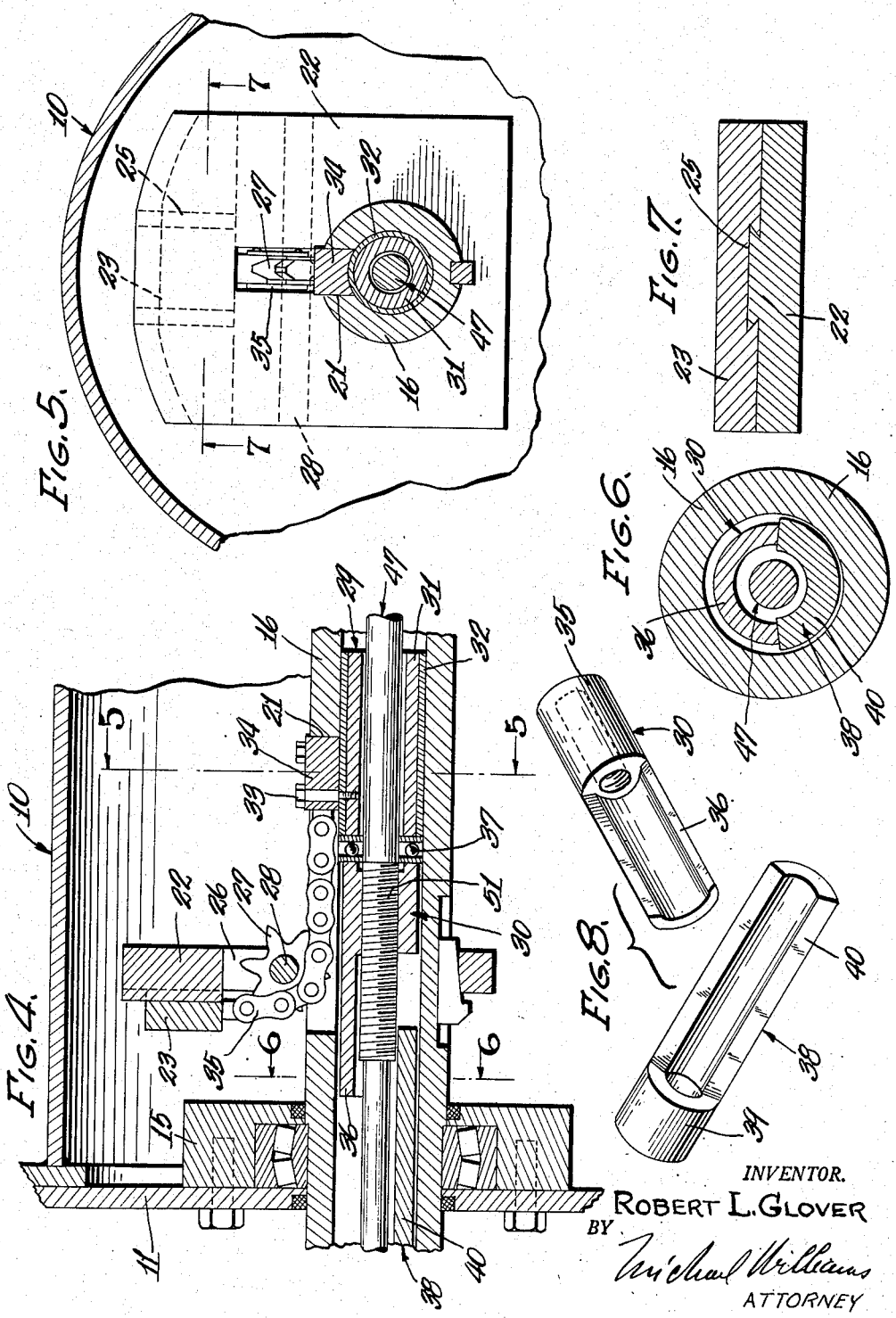
INVENTOR.
ROBERT L. GLOVER
BY
ATTORNEY Patented Nov. 24, 1953

2,660,067

UNITED STATES PATENT OFFICE 2,660,067

VIBRATION DEVICE

Robert L. Glover, Poland, Ohio

Application August 2, 1949, Serial No. 108,190

10 Claims. (Cl. 74—87)

My invention relates to vibration devices, more particularly to such devices wherein the amplitude of vibration may be varied, and the principal object of my invention is to provide new and improved devices of this character.

My invention provides a vibration device that is relatively inexpensive to manufacture, yet provides a sturdy and reliable construction requiring little maintenance. The invention also provides means for accurately and easily varying the amplitude of vibration, thus adapting the construction for a multitude of uses.

In the drawings accompanying this specification and forming a part of this application, there is shown, for purposes of illustration, an embodiment which my invention may assume, and in these drawings:

Figure 1 is a broken central longitudinal sectional view through an embodiment disclosing the invention, Figure 2 is a fragmentary end elevational view of the embodiment as viewed from the left hand side of Figure 1, Figure 3 is a fragmentary end elevational view of the embodiment as viewed from the right hand side of Figure 1, Figure 4 is a fragmentary sectional view, drawn to a slightly enlarged scale, showing parts of the embodiment in position different from that shown in Figure 1, Figure 5 is a fragmentary transverse sectional view corresponding generally to the line 5—5 of Figure 4, Figure 6 is an enlarged sectional view corresponding generally to the line 6—6 of Figure 4, Figure 7 is a sectional view corresponding generally to the line 7—7 of Figure 5, and Figure 8 is a perspective view illustrating two parts used in the embodiment disclosed.

Referring to the embodiment herein disclosed, the vibration device is preferably disposed within a cylindrical shell 10 which may be part of the device or part of the apparatus to be vibrated. End plates 11 and 12 are secured to transverse sections 13 of the shell 10, as by means of bolts 14. Each end plate 11 and 12, preferably on its inner surface, carries a bearing 15, and a hollow shaft 16 is journalled in the bearings. Each bearing preferably has a seal 17 and each end plate 11 and 12 preferably has a seal 18 for the purpose of excluding foreign matter from the bearings and retaining lubrication therein. A pulley 19 is secured to the shaft 16, preferably exteriorly of the end plate 11 and belts 20 are trained over the pulley 19 and over a pulley on a motor (not shown) for the purpose of rotating the shaft 16.

The shaft 16 is formed with a pair of spaced-apart slots 21 for a purpose later to be explained. Secured to the shaft 16 and rotatable therewith are spaced-apart collar means 22, each here shown as a plate disposed eccentric with respect to the shaft 16 and in that respect forming an off-center weight which imparts vibratory motion as the shaft 16 is rotated.

A weight 23 is carried by each of the collar means 22 for movement toward and away from the axis of the shaft 16 to thereby provide adjustment of the amplitude of vibration. In the embodiment disclosed, the weights 23 are slidably carried by respective collar means, and a preferred construction is to provide a dove-tailed connection between the parts, as best shown at 25 in Figure 7. Each of the collar means 22 is formed with a slot 26 extending therethrough, and disposed in a respective slot is a sprocket wheel 27 which is rotatable on a shaft 28 carried by the respective collar means.

Means 29 slidable axially with respect to the shaft 16, but rotatable therewith, have connection with a respective weight 23, the connection being so constructed and arranged that the centrifugal force of the weight urges the slidable means to shift in a predetermined direction.

Stop means 30 are provided for cooperation with respective slidable means 29, the stop means providing an abutment against which the slidable means is urged by centrifugal force of a respective weight 23, the stop means being movable to selected positions to thereby determine the amount of eccentricity of the weights 23.

In the embodiment herein disclosed, each slidable means 29 comprises a sleeve 31 provided with a peripheral bearing surface 32 engaging with the inner surface of the hollow shaft 16 adjacent to a respective slot 21. Secured to each slidable means 29, as by means of bolts 33, is a block 34 which rides within a respective slot 21 and thus holds the slidable means 29 to rotation with the shaft 16. A sprocket chain 35 is here shown as forming the connection between a block 34 and its respective weight 23, the chain being trained over a respective sprocket wheel 27.

Each stop means 30, as best seen in Figure 8, comprises a tubular portion 35 formed with internal screw threads and having a tail 36 which is here shown as a part of a tubular section which extends radially slightly greater than 180°. Each stop means is disposed within the hollow shaft and is movable axially to selected positions.

Preferably, a thrust bearing 37 is interposed between cooperable slidable means 29 and stop means 30, since the slidable means rotates and the stop means is stationary.

In order to hold the stop means 30 stationary, and with particular reference to the construction at the left hand side of Figure 1, a member 38 (see Figure 8) is provided, this member comprising a tubular portion 39 and a tail 40 which is here shown as part of a tubular section which extends radially slightly less than 180°. As best seen in Figure 6, the tails 36 and 40 complement each other transversely.

Again referring to the construction at the left hand side of Figure 1, the tubular portion 39 of the member 38 is fixed, against rotation, to a supporting plate 41, preferably by means of welding this tubular portion within position in an aperture in the plate 41. The plate 41 may be held to the end plate 11 by means of spacer blocks 42. Thus, it will be appreciated that the cooperating tails 36 and 40 prevent rotation of the stop means 30 but provide for axial adjustment of the stop means.

With respect to the construction at the right hand side of Figure 1, the member 38 is substantially similar to that already described, except that the tail 40 is not as great in length since no pulley is required at this end. In this case, the tubular portion 39 of the member 38 is welded to position within an aperture in a supporting plate 43, and this plate is held to the end plate 12 by means of spacer blocks 44. A tube 45, welded to the end plate 12, has its free end fitting within a gasket 46, the latter being seated in a recess in the supporting plate 43. This construction excludes foreign matter from cooperating parts.

Means is provided for shifting the stop means to selected position, and in the embodiment herein disclosed, a single means is provided for simultaneously shifting both stop means in correlated manner. A presently preferred construction comprises a screw rod 47 disposed within the shaft 16, and extending through shiftable means 29 and stop means 30, through tubular portions 39 of members 38, and terminating exteriorly of supporting plates 41 and 43. Bearings 48 are interposed between the screw rod 47 and tubular portions 39 of members 38 to properly support the rod. Exteriorly of supporting plate 41, a collar 49 is secured to the screw rod to hold such rod from shifting axially in one direction. A hand wheel 50 is secured to the opposite extremity of the screw rod 47 for the purpose of rotating such rod.

The rod 47 is formed with oppositely threaded portions 51 and 52, each portion cooperating with the threads formed on the tubular portion of a respective stop means 30. Thus, rotation of the rod 47, by means of the hand wheel 50, will effect axial movement of the stop means in opposite directions, and in view of the construction herein disclosed the stop means will be axially advanced or retracted in related manner. Since the centrifugal force of the weights 23 urge the shiftable means 29 toward respective stop means, the weights 23, through connection with the shiftable means 29 will be moved toward or away from the axis of the shaft 16 in related manner, thus providing for accurate control of the adjustment of the amplitude of vibration. Figure 1 shows the weights in maximum extended position, and Figure 4 shows one of the weights in maximum retracted position. It will be appreciated that by proper adjustment of the screw rod 47, any desired intermediate position of the weights may be obtained.

In view of the foregoing, it will apparent to those skilled in the art that I have accomplished at least the principal object of my invention, and it also will be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. A vibration device, comprising: a rotatable shaft; collar means rotatable with said shaft; weight means movably carried by said collar means for movement toward and away from the axis of said shaft, thereby providing for adjustment of the amplitude of vibration; screw means rotatable with respect to said shaft; nut means threaded on said screw means and movable axially with respect to the axis of said shaft upon rotation of said screw means, said nut means having connection with said weight means so constructed and arranged whereby said weight means is adjusted with respect to the axis of said shaft in accordance with the rotation of said screw means.

2. A vibration device, comprising: a hollow rotatable shaft; a first weight eccentric and rotatable with said shaft and being fixedly secured with respect to the axis of said shaft; a second weight combining with said first weight to provide for vibratory motion, said second weight being slidably carried by said first weight for movement toward and away from the axis of said shaft, thereby to provide for adjustment of the amplitude of vibration; screw means rotatable within said shaft; nut means held to movement axially of said shaft and being threaded on said screw means; bearing means rotatable with said shaft and slidable axially of said shaft, said bearing means having abutting relationship with said nut means; and flexible means connecting said second weight with said bearing means; the foregoing construction being such that centrifugal force of said second weight maintains said bearing means in abutting relationship with said nut means, the position of said nut means determining the position of said weight means with respect to the axis of said shaft.

3. A vibration device, comprising: a rotatable shaft; weight means rotatable with said shaft and movable toward and away from the axis of said shaft to provide for adjustment of the amplitude of vibration; stop means shiftable axially of said shaft and adapted to be held in adjusted position; means shiftable axially of said shaft and having abutting relation with said stop means; and flexible connection means connecting said shiftable means with said weight means, so constructed and arranged that centrifugal force of said weight means holds said shiftable means in abutting relation with said stop means, the amount of eccentricity of said weight means with respect to the axis of said shaft being determined by the adjusted position of said stop means.

4. A vibration device, comprising: a rotatable shaft; collar means rotatable with said shaft; weight means rotatable with said shaft and carried by said collar means for movement toward and away from the axis of said shaft to provide for adjustment of the amplitude of vibration; a sprocket wheel carried by said collar means; stop means shiftable axially of said shaft and adapted to be held in adjusted relation; means shiftable axially of said shaft and rotatable therewith, and having abutting relation with said stop means; and a sprocket chain running over said sprocket wheel and connecting said weight means and said shiftable means; the foregoing construction being such that the centrifugal force of weight means holds said shiftable means in abutting relation with said stop means, the amount of eccentricity of said weight means being determined by the adjusted position of said stop means.

5. A vibration device, comprising: a rotatable shaft; a pair of spaced-apart collar means rotatable with said shaft; weight means carried by each of said collar means and mounted for movement toward and away from the axis of said shaft to provide for adjustment of the amplitude of vibration; a pair of stop means each shiftable axially of said shaft; a single means for effecting correlated shifting of said stop means and adapted to hold said stop means in selected adjusted position; a pair of means shiftable axially of said shaft, each having abutting relation with a respective stop means; and connection means so constructed and arranged that centrifugal force of said weight means holds said shiftable means in abutting relation with a respective stop means, the amount of eccentricity of said weight means with respect to the axis of said shaft being determined by the adjusted position of said stop means.

6. A vibration device, comprising: a hollow rotatable shaft; a pair of first weights fixed to said shaft in spaced-apart relation and rotatable therewith; a pair of second weights combining with respective ones of said first weights to provide for vibratory motion, each of said second weights being slidably carried by a respective first weight for movement toward and away from the axis of said shaft to provide for adjustment of the amplitude of vibration; a sprocket wheel carried by each of said first weights; a pair of bearings rotatable with and slidable axially of said shaft and disposed intermediate said first weights; a sprocket chain connecting a second weight with a respective bearing and being trained over a respective sprocket wheel; a pair of stop means movable axially of said shaft but held against rotation therewith, each stop means being disposed axially outwardly of a respective bearing and forming an abutment against which such respective bearing abuts, each stop means comprising a nut portion, the nut portion of one being threaded opposite to the nut portion of the other; and a shaft disposed within said hollow shaft and having oppositely threaded portions cooperable with respective nut portions.

7. A vibration device, comprising: a rotatable shaft; collar means rotatable with said shaft, weight means rotatable with said shaft and carried by said collar means for movement toward and away from the axis of said shaft to provide for adjustment of the amplitude of vibration; stop means shiftable axially of said shaft and adapted to be held in adjusted relation; means shiftable axially of said shaft and rotatable therewith, and having abutting relation with said stop means; and flexible means connecting said weight means and said shiftable means, the foregoing construction being such that the centrifugal force of said weight means holds said shiftable means in abutting relation with said stop means, the amount of eccentricity of said weight means being determined by the adjusted position of said stop means.

8. A vibration device, comprising: a rotatable shaft; a pair of spaced-apart weight means, each rotatable with said shaft and each movable toward and away from the axis of said shaft to provide for adjustment of the amplitude of vibration; a pair of means shiftable to various positions; flexible connection means connecting a shiftable means with a respective weight means, said connection means being so constructed and arranged that centrifugal force of the respective weight means urges the respective shiftable means toward an extreme position; stop means cooperable with each of said shiftable means for holding the respective shiftable means in selected position against the centrifugal force of said weight means; and means for effecting simultaneous adjustment of said stop means, said adjustment causing movement of said stop means in a direction toward and away from each other.

9. A vibration device comprising a rotatable shaft, means connectable to said shaft and rotatable therewith and providing a slide track extending transversely of the axis of said shaft, weight means slideable along said track, shiftable means movable axially of said shaft effecting movement of said weight means toward and away from the axis of said shaft to provide for adjustment of the amplitude of vibration, and flexible means secured to and extending between said weight means and said shiftable means, said flexible means connecting said weight means and said shiftable means together for unitary movement.

10. A vibration device comprising a rotatable shaft, means connectable to said shaft and rotatable therewith and providing a slide track extending transversely of the axis of said shaft, weight means slideable along said track, shiftable means movable axially of said shaft effecting movement of said weight means toward and away from the axis of said shaft to provide for adjustment of the amplitude of vibration, and chain means secured to and extending between said weight means and said shiftable means, said chain means connecting said weight means and said shiftable means together for unitary movement.

ROBERT L. GLOVER.

References Cited in the file of this patent

UNITED STATES PATENTS

| Number | Name | Date |
|---|---|---|
| 1,125,500 | Ensminger | Jan. 19, 1915 |
| 2,323,479 | McCullough | July 6, 1943 |
| 2,457,413 | Stokes et al. | Dec. 28, 1948 |
| 2,483,318 | Lazan | Sept. 27, 1949 |
| 2,515,933 | Van Heeckeren | July 18, 1950 |
| 2,516,335 | Nevin et al. | July 25, 1950 |